(12) United States Patent
Weaver

(10) Patent No.: US 12,017,940 B2
(45) Date of Patent: Jun. 25, 2024

(54) BATH WATER RECYCLING SYSTEM

(71) Applicant: Ruth Weaver, Doraville, TX (US)

(72) Inventor: Ruth Weaver, Doraville, TX (US)

(*) Notice: Subject to any disclaimer, the term of this patent is extended or adjusted under 35 U.S.C. 154(b) by 22 days.

(21) Appl. No.: 17/670,954

(22) Filed: Feb. 14, 2022

(65) Prior Publication Data
US 2022/0298046 A1    Sep. 22, 2022

Related U.S. Application Data

(60) Provisional application No. 63/164,092, filed on Mar. 22, 2021.

(51) Int. Cl.
- *C02F 9/00* (2023.01)
- *C02F 103/00* (2006.01)
- *C02F 103/42* (2006.01)
- *E03B 1/04* (2006.01)

(52) U.S. Cl.
CPC .............. *C02F 9/00* (2013.01); *E03B 1/044* (2013.01); *C02F 2103/002* (2013.01); *C02F 2103/42* (2013.01); *C02F 2303/04* (2013.01); *C02F 2307/06* (2013.01); *E03B 2001/045* (2013.01)

(58) Field of Classification Search
None
See application file for complete search history.

(56) References Cited

U.S. PATENT DOCUMENTS

| | | | | |
|---|---|---|---|---|
| 175,835 | A * | 4/1876 | Keyser | A47G 27/0225 4/251.1 |
| 918,396 | A * | 4/1909 | Tracy | A47G 27/0225 4/251.1 |
| D54,611 | S * | 3/1920 | Freitag | D15/9.1 |
| 1,340,534 | A * | 5/1920 | Freitag | B67D 1/16 4/251.1 |
| 1,349,314 | A * | 8/1920 | Buesing | F25D 21/14 4/251.1 |
| 1,572,275 | A * | 2/1926 | Ewing | A47K 3/20 4/601 |
| 2,308,452 | A * | 1/1943 | Ortyl | A47K 3/32 4/603 |
| 2,499,115 | A * | 2/1950 | Shobe | E03D 1/00 4/293 |
| 3,112,497 | A * | 12/1963 | Call | E03F 5/18 4/415 |
| 3,183,525 | A * | 5/1965 | O'Brien | E03D 5/016 4/DIG. 9 |
| 3,263,678 | A * | 8/1966 | Everston | A61H 33/02 601/169 |
| 3,304,950 | A * | 2/1967 | Hubert | D06F 39/081 312/229 |

(Continued)

*Primary Examiner* — Robert J Popovics
(74) *Attorney, Agent, or Firm* — Brennan, Manna & Diamond, LLC

(57) ABSTRACT

A water recycling system for reprocessing and reusing bathing water from a bath or shower. The bathing water recycling system treats and reuses water that overflows from a bathtub or shower pan. The used bathing water is captured and retained after use. The captured dirty water is then filtered and purified. The filtered and purified water can be redistributed back into the shower or bathtub for reuse alone or in combination with additional fresh water. The treated water may also be rewarmed prior to reuse. Unneeded greywater water is redirected to the drain for disposal.

8 Claims, 8 Drawing Sheets

(56) References Cited

U.S. PATENT DOCUMENTS

| | | | | |
|---|---|---|---|---|
| 3,318,449 A * | 5/1967 | Jennings | E03B 1/04 | 210/127 |
| 3,374,492 A * | 3/1968 | Ruderian | A61H 33/0087 | 4/541.4 |
| 3,543,294 A * | 11/1970 | Boester | E03B 3/40 | 4/320 |
| 3,571,818 A * | 3/1971 | Jacuzzi | A61H 33/0087 | 392/447 |
| 3,571,820 A * | 3/1971 | Jacuzzi | A61H 33/6078 | 4/541.4 |
| 3,594,825 A * | 7/1971 | Reid | B61D 35/00 | 4/663 |
| 3,606,618 A * | 9/1971 | Veech | A47K 3/325 | 4/603 |
| 3,614,952 A * | 10/1971 | Agnellino | A61H 33/601 | 4/584 |
| 3,717,142 A * | 2/1973 | Mikelson | A61H 33/02 | 4/570 |
| 3,995,327 A * | 12/1976 | Hendrick | E03D 1/00 | 4/408 |
| 4,069,521 A * | 1/1978 | Aleman | E03D 5/006 | 4/300 |
| 4,115,879 A * | 9/1978 | Toms | E03B 1/04 | 210/138 |
| 4,162,218 A * | 7/1979 | McCormick | C02F 1/006 | 210/167.01 |
| 4,197,597 A * | 4/1980 | Toms | E03B 1/04 | 4/300 |
| 4,228,006 A * | 10/1980 | Hanna | E03B 1/04 | 210/167.3 |
| 4,240,166 A * | 12/1980 | Altman | B29C 53/083 | 4/492 |
| 4,358,862 A * | 11/1982 | Altman | A61H 33/027 | 4/492 |
| 4,359,789 A * | 11/1982 | Roberts | E03B 1/041 | 4/300 |
| 4,398,308 A * | 8/1983 | Berg | A47K 3/28 | 4/596 |
| 4,413,363 A * | 11/1983 | Troiano | A47K 3/286 | 4/596 |
| 4,419,775 A * | 12/1983 | Ebert | A61H 33/02 | 261/DIG. 75 |
| 4,539,720 A * | 9/1985 | Westerweller | A47K 3/325 | 4/596 |
| 4,724,553 A * | 2/1988 | Bianchi | A47K 3/287 | 4/615 |
| 4,763,366 A * | 8/1988 | Moreland | A61H 33/6078 | 4/541.3 |
| 4,828,709 A * | 5/1989 | Houser | A47K 3/28 | 4/597 |
| 4,893,364 A * | 1/1990 | Keeler | E03C 1/00 | 4/603 |
| 4,903,723 A * | 2/1990 | Sublett | A47L 15/421 | 4/251.1 |
| 4,947,494 A * | 8/1990 | Moreland | A61H 33/6078 | 137/625.48 |
| 5,099,874 A * | 3/1992 | Della Cave | E03C 1/122 | 137/357 |
| 5,106,493 A * | 4/1992 | McIntosh | C02F 9/00 | 210/100 |
| 5,147,532 A * | 9/1992 | Leek, Jr. | E03B 1/04 | 210/182 |
| 5,160,606 A * | 11/1992 | De Simone | E03B 1/04 | 210/232 |
| 5,173,180 A * | 12/1992 | Stewart | E03B 1/041 | 210/167.01 |
| 5,192,426 A * | 3/1993 | DeCoster | E03B 1/04 | 210/170.07 |
| 5,206,963 A * | 5/1993 | Wiens | E03C 1/00 | 4/603 |
| 5,210,886 A * | 5/1993 | Coe, III | E03B 1/044 | 4/665 |
| 5,217,042 A * | 6/1993 | Delle Cave | E03C 1/122 | 137/357 |
| 5,217,323 A * | 6/1993 | Bilson | E03B 1/04 | 405/36 |
| 5,224,508 A * | 7/1993 | Bates, Jr. | D06F 39/081 | 4/251.1 |
| 5,236,581 A * | 8/1993 | Perry | B01D 37/025 | 210/205 |
| 5,241,843 A * | 9/1993 | Hein | D06F 39/20 | 68/3 R |
| 5,243,719 A * | 9/1993 | McDonald | E03B 1/04 | 4/415 |
| 5,293,654 A * | 3/1994 | Castwall | E03C 1/00 | 4/603 |
| 5,307,650 A * | 5/1994 | Mertz | D06F 39/006 | 68/18 F |
| 5,313,677 A * | 5/1994 | Coe | F16K 31/46 | 4/683 |
| 5,345,625 A * | 9/1994 | Diemand | E03C 1/00 | 4/665 |
| 5,437,303 A * | 8/1995 | Johnson | D06F 39/081 | 4/251.1 |
| 5,452,739 A * | 9/1995 | Mustee | A47L 15/4212 | 4/251.1 |
| 5,452,956 A * | 9/1995 | Gilliam | E03B 1/04 | 366/348 |
| 5,503,294 A * | 4/1996 | Taylor | B65D 1/22 | 220/558 |
| 5,511,254 A * | 4/1996 | O'Brien | A61H 33/06 | 4/526 |
| 5,573,677 A * | 11/1996 | Dembrosky | C02F 1/50 | 210/764 |
| RE35,410 E * | 12/1996 | Adcock | E04H 4/1209 | 4/488 |
| 5,620,594 A * | 4/1997 | Smith | B01D 21/2466 | 210/523 |
| D388,566 S * | 12/1997 | Reid | D32/25 | |
| 5,794,609 A * | 8/1998 | Grant | F24H 9/17 | 122/504 |
| 5,845,346 A * | 12/1998 | Johnson, Jr. | E03B 1/04 | 4/665 |
| 5,883,300 A * | 3/1999 | Johnson | B60R 5/04 | 73/40 |
| 5,885,459 A * | 3/1999 | Lerche | D06F 39/20 | 210/615 |
| 6,134,722 A * | 10/2000 | Lowry | A61H 33/6063 | 4/678 |
| 6,299,775 B1 * | 10/2001 | Elston | C02F 9/00 | 210/744 |
| 6,673,251 B2 * | 1/2004 | Swales | C02F 1/78 | 210/764 |
| 6,702,942 B1 * | 3/2004 | Nield | E03B 1/04 | 210/418 |
| 6,746,612 B2 * | 6/2004 | Hammond | C02F 1/50 | 210/764 |
| 6,887,375 B2 * | 5/2005 | Johnson | E03B 1/04 | 210/170.03 |
| 6,904,926 B2 * | 6/2005 | Aylward | E03B 1/044 | 137/597 |
| 6,981,613 B1 * | 1/2006 | Kamisugi | B05B 1/205 | 222/93 |
| 7,121,292 B2 * | 10/2006 | Aylward | E03B 1/04 | 137/119.01 |
| 7,735,510 B1 * | 6/2010 | Carter | A47B 97/00 | 220/571 |
| 7,854,852 B1 * | 12/2010 | Reavis | E03B 1/04 | 210/767 |
| 7,913,331 B2 * | 3/2011 | Hartman | F28D 7/0066 | 4/665 |
| 8,191,307 B2 * | 6/2012 | Donoghue | A01G 25/16 | 47/79 |
| 8,216,455 B1 * | 7/2012 | O'Brien | C02F 1/30 | 137/563 |
| 8,272,080 B2 * | 9/2012 | Stimpson | E03C 1/12 | 4/613 |

(56) References Cited

U.S. PATENT DOCUMENTS

| | | | | |
|---|---|---|---|---|
| 8,376,178 B2* | 2/2013 | Steinberg | A47L 15/4212 | |
| | | | 220/558 | |
| 8,377,291 B2* | 2/2013 | Eckman | E03B 1/042 | |
| | | | 210/411 | |
| 8,590,559 B1* | 11/2013 | Gutierrez | G01M 3/16 | |
| | | | 200/61.04 | |
| 8,691,024 B2* | 4/2014 | Barniak, Jr. | E03D 9/002 | |
| | | | 4/662 | |
| 8,696,897 B2* | 4/2014 | Marugame | C02F 1/283 | |
| | | | 210/206 | |
| 8,776,280 B2* | 7/2014 | Baranj | E03D 11/16 | |
| | | | 4/251.1 | |
| 9,074,356 B2* | 7/2015 | Tarantino | E03B 1/048 | |
| 9,376,788 B1* | 6/2016 | Turner | E03B 1/042 | |
| 9,650,020 B1* | 5/2017 | Bindas | B01D 17/00 | |
| 9,758,955 B1* | 9/2017 | Lee | E03D 5/003 | |
| 9,849,409 B2* | 12/2017 | Jones | E03B 1/041 | |
| 9,970,184 B2* | 5/2018 | Green | E03C 1/264 | |
| 10,046,982 B2* | 8/2018 | McIntosh | C02F 1/50 | |
| 10,315,136 B2* | 6/2019 | Eckman | B01D 29/68 | |
| 10,557,644 B1* | 2/2020 | Steele | F24F 13/222 | |
| 10,774,509 B2* | 9/2020 | Green | C02F 1/00 | |
| 10,883,258 B2* | 1/2021 | Ridell | E03C 1/00 | |
| 10,934,691 B2* | 3/2021 | Thompson | C02F 1/008 | |
| 11,071,259 B2* | 7/2021 | McClain | E03B 3/06 | |
| 11,104,586 B2* | 8/2021 | Bertrand | C02F 1/001 | |
| 11,220,809 B2* | 1/2022 | Jacobs | E03C 1/0408 | |
| 11,351,935 B2* | 6/2022 | Van Beek | B60R 15/00 | |
| 11,447,939 B2* | 9/2022 | Pendlebury | E03C 1/12 | |
| 11,534,367 B2* | 12/2022 | Heaton | A61H 33/005 | |
| 11,559,140 B1* | 1/2023 | Li | F16N 99/00 | |
| 11,879,236 B2* | 1/2024 | Thompson | C02F 1/44 | |
| 11,906,990 B2* | 2/2024 | Shaaban | G05D 23/19 | |
| 11,912,212 B2* | 2/2024 | Van Beek | B63C 29/14 | |
| 2004/0168992 A1* | 9/2004 | Ben-Amotz | E03B 1/042 | |
| | | | 210/167.3 | |
| 2005/0045228 A1* | 3/2005 | Labrador | E03B 1/02 | |
| | | | 137/357 | |
| 2005/0056581 A1* | 3/2005 | Arguello | C02F 9/00 | |
| | | | 210/259 | |
| 2006/0059610 A1* | 3/2006 | Conant | E03D 11/00 | |
| | | | 4/251.1 | |
| 2006/0144769 A1* | 7/2006 | Okros | E03B 1/04 | |
| | | | 210/123 | |
| 2007/0068879 A1* | 3/2007 | Markle | C02F 9/00 | |
| | | | 210/202 | |
| 2007/0234474 A1* | 10/2007 | Gontar | E03C 1/12 | |
| | | | 4/613 | |
| 2008/0245713 A1* | 10/2008 | Martinello | E03D 5/003 | |
| | | | 210/112 | |
| 2009/0077728 A1* | 3/2009 | Garcia | A47G 27/0206 | |
| | | | 248/205.5 | |
| 2009/0261108 A1* | 10/2009 | Steinberg | A47L 15/4212 | |
| | | | 220/571 | |
| 2009/0266387 A1* | 10/2009 | McCormick | B60S 3/04 | |
| | | | 134/123 | |
| 2009/0300839 A1* | 12/2009 | Gay | A47K 3/40 | |
| | | | 4/613 | |
| 2010/0125938 A1* | 5/2010 | Billon | E03D 5/006 | |
| | | | 4/317 | |
| 2011/0289672 A1* | 12/2011 | Cummings | E03B 1/04 | |
| | | | 4/603 | |
| 2011/0289673 A1* | 12/2011 | Ballestra | E03C 1/12 | |
| | | | 4/613 | |
| 2012/0090707 A1* | 4/2012 | Marugame | C02F 1/283 | |
| | | | 137/565.01 | |
| 2012/0199220 A1* | 8/2012 | Knepp | E03B 1/041 | |
| | | | 137/558 | |
| 2012/0228117 A1* | 9/2012 | Panunzio | C02F 9/00 | |
| | | | 203/10 | |
| 2013/0212800 A1* | 8/2013 | Kaler | E03B 1/041 | |
| | | | 4/597 | |
| 2013/0284679 A1* | 10/2013 | Bailin | C02F 1/004 | |
| | | | 210/416.1 | |
| 2013/0305443 A1* | 11/2013 | Baranj | E03D 11/16 | |
| | | | 4/251.1 | |
| 2014/0021112 A1* | 1/2014 | Boodaghians | C02F 9/00 | |
| | | | 210/102 | |
| 2014/0033422 A1* | 2/2014 | Christy | E03C 1/00 | |
| | | | 4/598 | |
| 2014/0053909 A1* | 2/2014 | Savage | E03B 1/041 | |
| | | | 137/563 | |
| 2014/0061112 A1* | 3/2014 | Burd | B64D 11/02 | |
| | | | 210/234 | |
| 2014/0299555 A1* | 10/2014 | Green | E03C 1/24 | |
| | | | 137/565.17 | |
| 2016/0016836 A1* | 1/2016 | Sudnick | C02F 9/00 | |
| | | | 210/104 | |
| 2016/0320074 A1* | 11/2016 | Alsadah | F24H 9/2007 | |
| 2016/0339368 A1* | 11/2016 | McIntosh | C02F 1/50 | |
| 2016/0368802 A1* | 12/2016 | Yagita | C02F 1/42 | |
| 2017/0107701 A1* | 4/2017 | Lin-Hendel | C02F 1/78 | |
| 2017/0145669 A1* | 5/2017 | Klicpera | E03B 7/04 | |
| 2018/0022618 A1* | 1/2018 | Bertrand | C02F 1/001 | |
| | | | 210/103 | |
| 2018/0127953 A1* | 5/2018 | Noren | A47L 15/4225 | |
| 2018/0171608 A1* | 6/2018 | Green | E03B 1/042 | |
| 2019/0003157 A1* | 1/2019 | Greidanus | E03C 1/00 | |
| 2019/0003158 A1* | 1/2019 | De Jong | E03C 1/00 | |
| 2019/0047878 A1* | 2/2019 | Thompson | C02F 1/686 | |
| 2019/0301145 A1* | 10/2019 | Ridell | A61L 2/10 | |
| 2019/0323210 A1* | 10/2019 | Mahdjoubi Namin | E03B 1/041 |
| 2020/0141838 A1* | 5/2020 | Ridell | E03C 1/00 | |
| 2020/0256041 A1* | 8/2020 | Kitagawa | C02F 1/004 | |
| 2020/0299936 A1* | 9/2020 | Bodén | E03B 1/04 | |
| 2020/0318323 A1* | 10/2020 | Pendlebury | E03C 1/025 | |
| 2021/0047202 A1* | 2/2021 | Ridell | C02F 1/008 | |
| 2021/0404152 A1* | 12/2021 | Eilmus | E03B 1/042 | |
| 2022/0018100 A1* | 1/2022 | Mazzei | A47K 3/40 | |
| 2022/0145596 A1* | 5/2022 | Thompson | C02F 1/44 | |
| 2022/0162105 A1* | 5/2022 | Wang | C02F 9/00 | |
| 2022/0298046 A1* | 9/2022 | Weaver | E03B 1/041 | |
| 2022/0316191 A1* | 10/2022 | Clarke | C02F 1/003 | |

* cited by examiner

BATH WATER RECYCLING SYSTEM

CROSS-REFERENCE TO RELATED APPLICATION

The present application claims priority to, and the benefit of, U.S. Provisional Application No. 63/164,092, which was filed on Mar. 22, 2021 and is incorporated herein by reference in its entirety.

FIELD OF THE INVENTION

The present invention generally relates to a water conservation assembly, and more specifically to a bathing water recycling system configured to conserve water. Accordingly, the present specification makes specific reference thereto. However, it is to be appreciated that aspects of the present invention are also equally amenable to other like applications, devices, and methods of manufacture.

BACKGROUND

Fresh water is an increasingly limited global resource. Population, household size and growth and affluence all affect how much water is used. Factors such as climate change have increased pressures on natural water resources. Many countries have already implemented policies aimed at water conservation with varying degrees of success. There are a variety of technology solutions currently existing for households, commercial, and agricultural applications. One strategy for water conservation is practicing sustainable methods of utilizing fresh groundwater resources.

There are a wide variety of water-saving technologies specifically directed toward residential users. Low-flow or energy-efficient shower heads reduce the amount of water use in showers. Low flush or dual flush toilets can use up to ⅔ less water than conventional toilets. High efficiency appliances similarly use significantly less water than conventional appliances. Faucet aerators are designed to break water flow into fine droplets to maintain "wetting effectiveness" while using less water while reduce splashing while washing hands and dishes. Wastewater reuse includes using greywater for flushing toilets or for watering landscapes and gardens.

The water shortage has become an increasingly difficult problem to manage. A significant portion of the world's population live in areas where the demand for water exceeds its supply. The imbalance between supply and demand, along with persisting issues such as climate change and population growth, has made water reuse a necessary method for conserving water. There are a variety of methods used in the treatment of wastewater to ensure that it is safe to use for irrigation of food crops and/or drinking water.

Wasting of water is an additional issue related to water conservation. In household applications, wasting of water is the causing or permitting discharge of water without any practical purpose. Inefficient water use is also considered wasteful. A concept that is closely related to water wasting is water-use efficiency. Water use is considered inefficient if the same purpose of its use can be accomplished with less water. Technical efficiency derives from engineering practice where it is typically used to describe the ratio of output to input and is useful in comparing various products and processes. For example, one showerhead would be considered more efficient than another if it could accomplish the same purpose (i.e., of showering) by using less water or other inputs (e.g., lower water pressure).

Many people may enjoy taking prolonged baths and showers to relax and bathe. Unfortunately, this practice can lead to excessive water usage, ultimately costing a considerable amount of money in utility bills and a significant wasting of potable water. As a result, people may be looking for innovative ways to recycle and conserve water safely to reuse in their bath and shower.

Accordingly, there is a great need for a way to recycle and reuse bathing water. There is also a need for a way for a combination bath and basin system designed to utilize water overflow from the bath to recycle and conserve water. There is also a need for a way to catch overflow bath water for reuse. Similarly, there is a need for a water recycling system that rew arms, purifies, and filters bathing water and allows it to be redistributed back into the bath or shower for reuse. Further, there is a need for an innovative way of ensuring users are more environmentally conscious of their water choices.

In this manner, the improved bathing water recycling system of the present invention accomplishes all of the forgoing objectives, thereby providing an easy solution for conserving and reusing potable water. A primary feature of the present invention is a water recapture component designed to capture and retain overflow bath water. The present invention allows the recaptured bath or shower water to be filtered, purified, and rewarmed. The treated water is then redistributed back into the bath or shower for reuse. Finally, the improved bathing water recycling system of the present invention is capable of providing users an environmentally friendly way of conserving and reusing water.

SUMMARY

The following presents a simplified summary in order to provide a basic understanding of some aspects of the disclosed innovation. This summary is not an extensive overview, and it is not intended to identify key/critical elements or to delineate the scope thereof. Its sole purpose is to present some concepts in a simplified form as a prelude to the more detailed description that is presented later.

The subject matter disclosed and claimed herein, in one embodiment thereof, comprises a bathing water recycling system. The bathing water recycling system comprises a primary water collection component and an overflow water collection component. The primary water collection component may be a primary water collection bathtub. The primary water collection component comprises a plurality of sidewalls and a treated water inlet. Used water may overflow the plurality of sidewalls and down into the overflow water collection component. Alternatively, the primary water collection component may further comprise a greywater outlet. The greywater outlet penetrates one or more of the plurality of sidewalls and leads to the overflow water collection component.

The overflow water collection component may be an overflow water collection catch basin. The overflow water collection component is configured for receiving and retaining water overflow from the primary water collection component. The overflow water collection component is positioned directly below or underneath the primary water collection component. The overflow water collection component is wider and longer than the primary water collection component so as to be able to collect and hold any overflow water.

The overflow water collection component comprises a water recycling outlet. The water recycling outlet may comprise a plurality of grates. The water recycling outlet further comprises a three-way valve. The three-way valve comprises a greywater drain.

The bathing water recycling system further comprises a water recycling component and a pump. The pump is in fluid communication with the water recycling component. The water recycling component is configured to treat the overflow water. The overflow water may be mechanically filtered, chemically filtered, purified, or any combination thereof. The overflow water may also be reheated. The pump is configured to redirect the treated water back into the primary water collection component.

The water recycling component may comprise a filtration element. The filtration element is configured to filter the overflow water mechanically or chemically. The water recycling component may comprise a purification element. The purification element is configured to purify the overflow water by sterilization. The water recycling component may comprise a heating element. The heating element is configured to reheat the overflow water prior to reuse. Once the overflow water is treated, the pump redirects the treated water back into the primary water collection bathtub for reuse.

In an additional embodiment, the subject matter disclosed and claimed herein, in one embodiment thereof, comprises a bathing water recycling system for a shower. The bathing water recycling system comprises a primary water collection shower pan and an overflow water collection catch basin. The primary water shower pan comprises a plurality of sidewalls and a floor. Used water may overflow the plurality of sidewalls and down into the overflow water collection catch basin. Alternatively, the primary water collection shower pan may further comprise a greywater outlet. The greywater outlet penetrates one or more of the plurality of sidewalls or the floor and leads to the overflow water collection catch basin.

The overflow water collection catch basin is configured for receiving and retaining water overflow from the primary water collection shower pan. The overflow water collection catch basin is positioned directly below or underneath the primary water collection shower pan. The overflow water catch basin is wider and longer than the primary water collection shower pan so as to be able to collect and hold any overflow water.

The overflow water collection catch basin comprises a water recycling outlet. The water recycling outlet may comprise a plurality of grates. The water recycling outlet further comprises a three-way valve. The three-way valve comprises a greywater drain.

The bathing water recycling system further comprises a water recycling component and a pump. The pump is in fluid communication with the water recycling component. The water recycling component is configured to treat the overflow water. The overflow water may be mechanically filtered, chemically filtered, purified, or any combination thereof. The overflow water may also be reheated. The pump is configured to redirect the treated water back into the shower.

The water recycling component may comprise a filtration element. The filtration element is configured to filter the overflow water mechanically or chemically. The water recycling component may comprise a purification element. The purification element is configured to purify the overflow water by sterilization. The water recycling component may comprise a heating element. The heating element is configured to reheat the overflow water prior to reuse. Once the overflow water is treated, the pump redirects the treated water back into the shower for reuse.

To the accomplishment of the foregoing and related ends, certain illustrative aspects of the disclosed innovation are described herein in connection with the following description and the annexed drawings. These aspects are indicative, however, of but a few of the various ways in which the principles disclosed herein can be employed and is intended to include all such aspects and their equivalents. Other advantages and novel features will become apparent from the following detailed description when considered in conjunction with the drawings.

BRIEF DESCRIPTION OF THE DRAWINGS

The description refers to provided drawings in which similar reference characters refer to similar parts throughout the different views, and in which.

DETAILED DESCRIPTION

Figure 1:
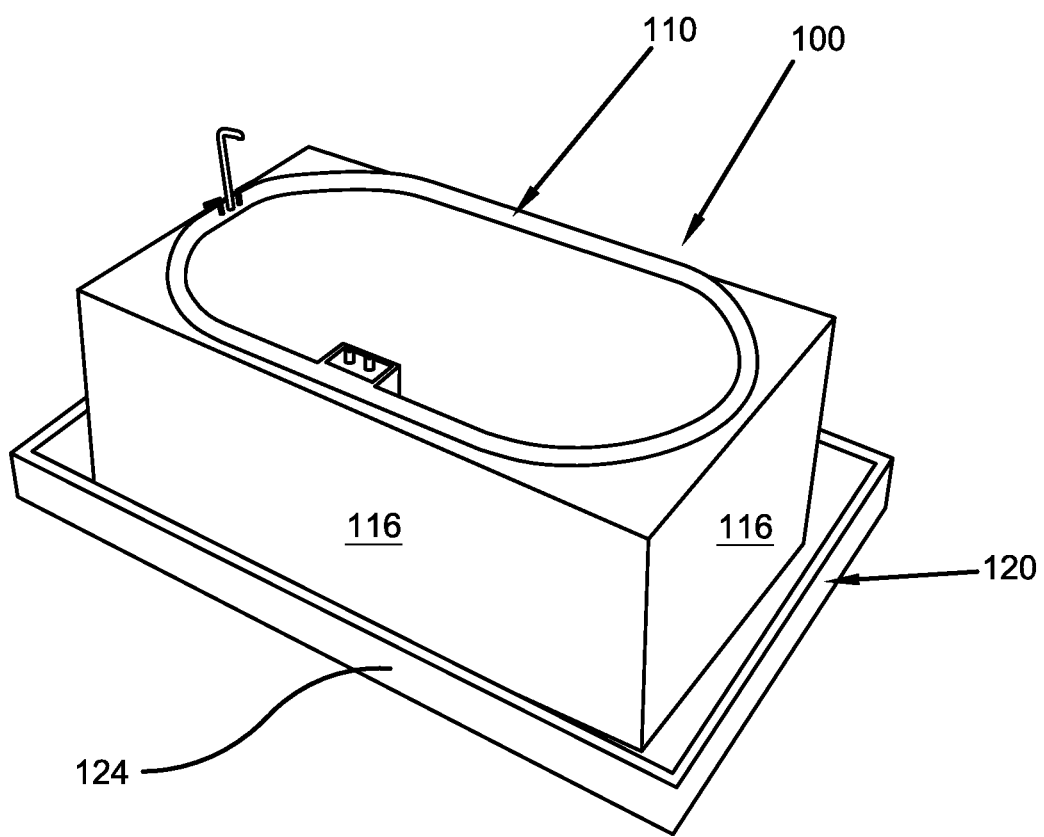
FIG. 1 illustrates a perspective view of a bathing water recycling system of the present invention in accordance with the disclosed architecture.

The innovation is now described with reference to the drawings, wherein like reference numerals are used to refer to like elements throughout. In the following description, for purposes of explanation, numerous specific details are set forth in order to provide a thorough understanding thereof. It may be evident, however, that the innovation can be practiced without these specific details. In other instances, well-known structures and devices are shown in block diagram form in order to facilitate a description thereof. Various embodiments are discussed hereinafter. It should be noted that the figures are described only to facilitate the description of the embodiments. They do not intend as an exhaustive description of the invention or do not limit the scope of the invention. Additionally, an illustrated embodiment need not have all the aspects or advantages shown. Thus, in other embodiments, any of the features described herein from different embodiments may be combined.

The present invention provides users with a combination bath and basin system designed to utilize water overflow from the bath to recycle and conserve water. The invention features a basin installed under the bath, catching overflow bath water, and allowing it to flow into a recycling and purification system. The invention may include a three-way valve so the water can be drained and sent into a filtration and purification system for recycling the water. The invention warms the filtered water and allows it to be redistributed back into the bath or shower. The invention offers a way to recycle and conserve water, ensuring users are more environmentally conscious of their water choices.

The present invention, in one exemplary embodiment, is an improved water conservation system used in conjunction with a bath or shower. The system is comprised of a bathtub or shower area with a basin surrounding the perimeter. The basin can be between approximately three and four inches in height to accommodate a significant volume of water for recycling into a pump and filtration system.

The filtration system may be attached to the bath via a three-way valve and several small, open grates. Water overflows from the bath, down into the basin area and then into the grates. Water is directed into the three-way valve for draining or to be sent into the filtration and purification system. The filtration system recycles and warms water, sending it back into the bath. The loop system conserves water while offering a way for people to relax and bathe without worry of wasting water.

Figure 2:
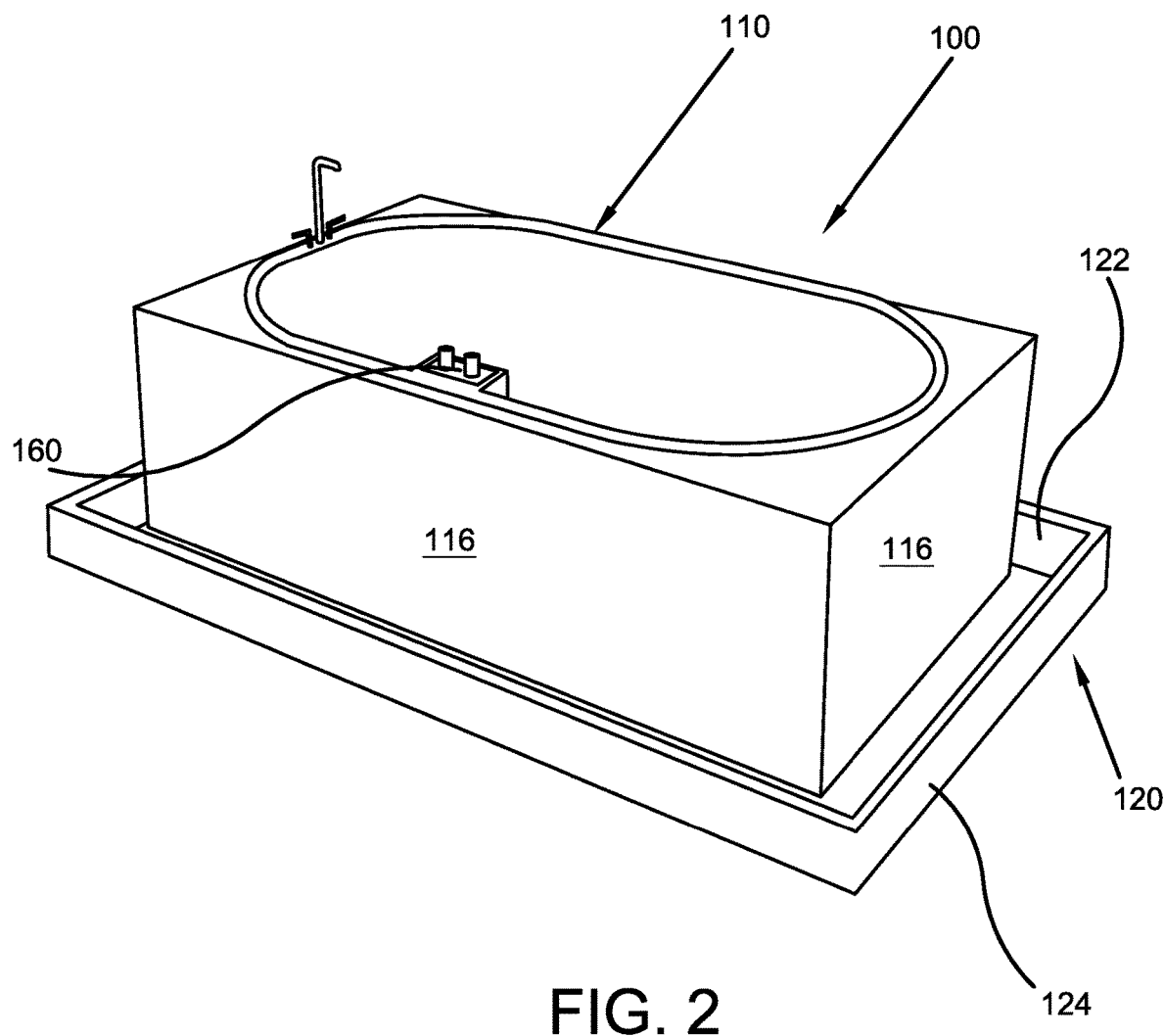
FIG. 2 illustrates a perspective view of the bathing water recycling system of the present invention in accordance with the disclosed architecture.
Figure 3:
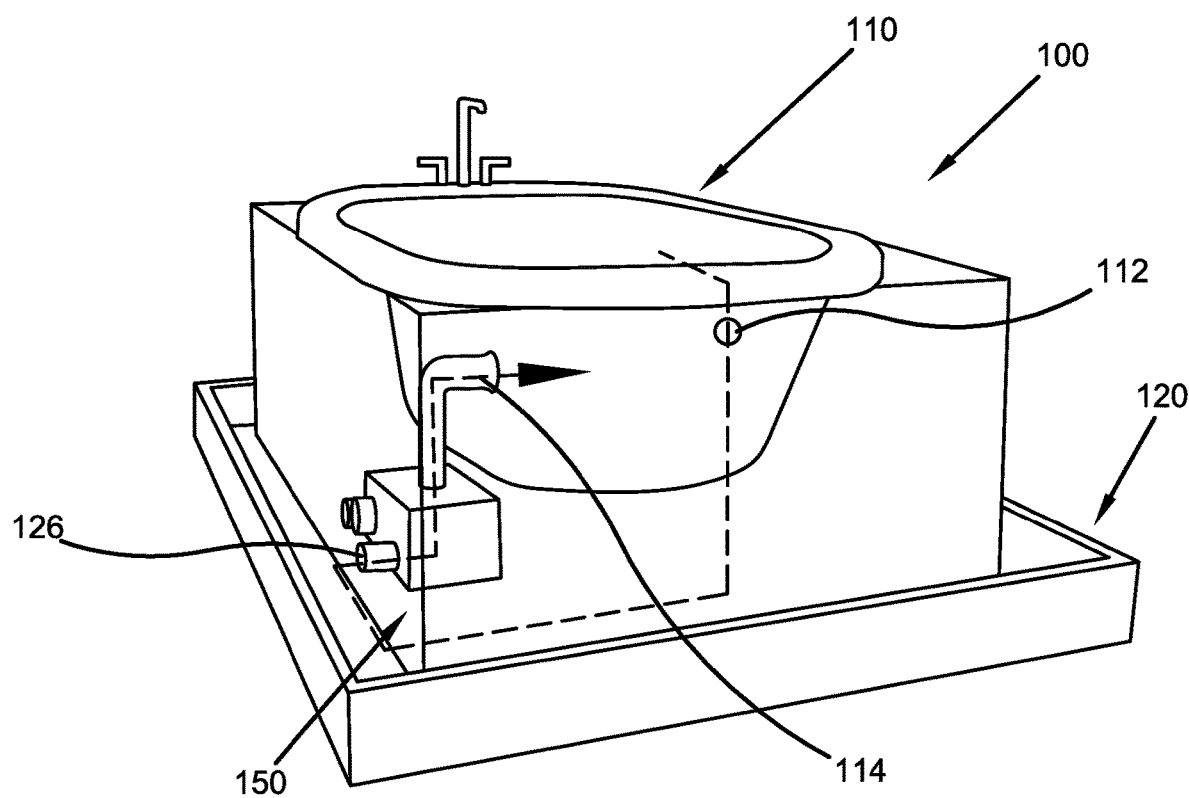
FIG. 3 illustrates a side perspective view of the bathing water recycling system of the present invention in accordance with the disclosed architecture.
Figure 4:
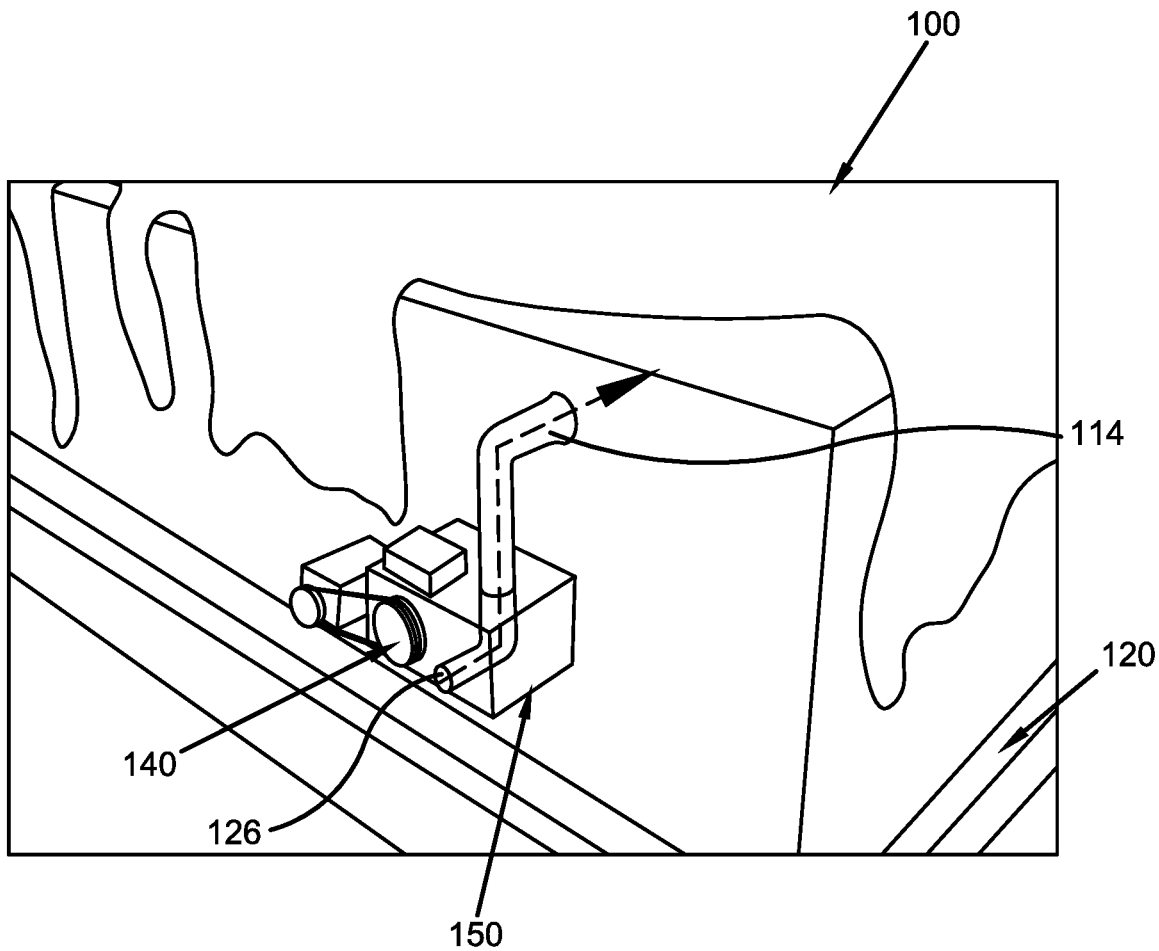
FIG. 4 illustrates a closeup perspective view of the bathing water recycling system of the present invention in accordance with the disclosed architecture.

Referring initially to the drawings, FIGS. 1-7 illustrate a bathing water recycling system 100. The bathing water recycling system 100 is configured for use in conjunction with a bath or shower. As illustrated in FIGS. 1-3, the bathing water recycling system 100 comprises a primary water collection component 110 and an overflow water collection component 120. The primary water collection component 110 may be a bathtub. The bathtub may be any type of tub, including, but not limited to freestanding, alcove, drop-in, corner, drop-in, or the like.

Figure 7:
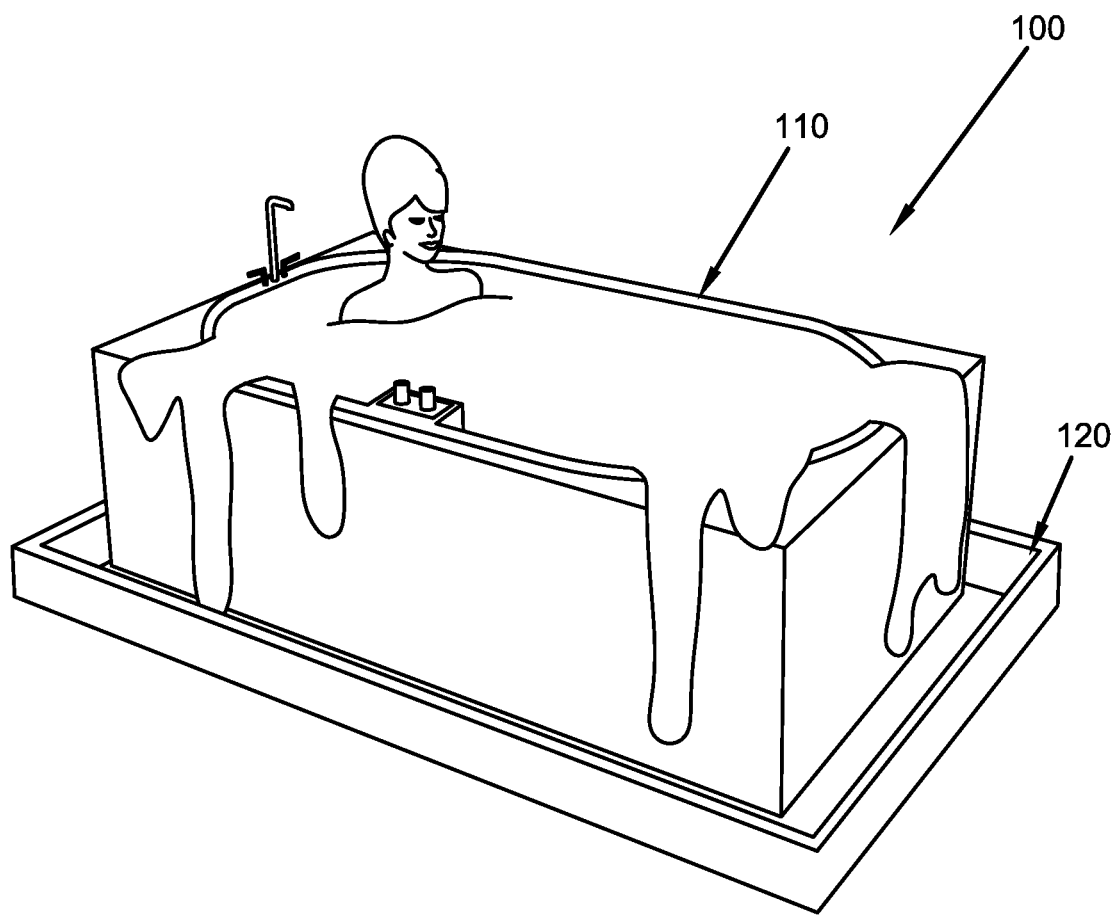
FIG. 7 illustrates a perspective view of a bathing water recycling system of the present invention in accordance with the disclosed architecture.

The primary water collection component 110 comprises a plurality of sidewalls 116 and a treated water inlet 114. The treated water inlet 114 is generally separate from the regular water inlet to the tub and may have a back-flow valve. As illustrated in FIG. 7, used bathing water may overflow the plurality of sidewalls 116 and down into the overflow water collection component 120 while a user is taking a bath. Alternatively, the primary water collection component 110 may further comprise a greywater outlet 112. The greywater outlet 112 penetrates one or more of the plurality of sidewalls 116 and leads to the overflow water collection component 120 as illustrated in FIG. 3.

The overflow water collection component 120 may be a catch basin 122 or water pan. The overflow water collection component 120 comprises a plurality of sidewalls 124. The overflow water collection component 120 is configured for receiving and retaining water overflow from the primary water collection component 110. The overflow water collection component 120 may be constructed from plastic or natural materials. The overflow water collection component 120 is positioned directly below or underneath the primary water collection component 110. The overflow water collection component 120 is wider and longer than the primary water collection component 110 so as to be able to collect and hold any overflow water. The overflow water collection component 120 is typically at least three inches in depth to be able to hold all of the overflow water.

Figure 5:
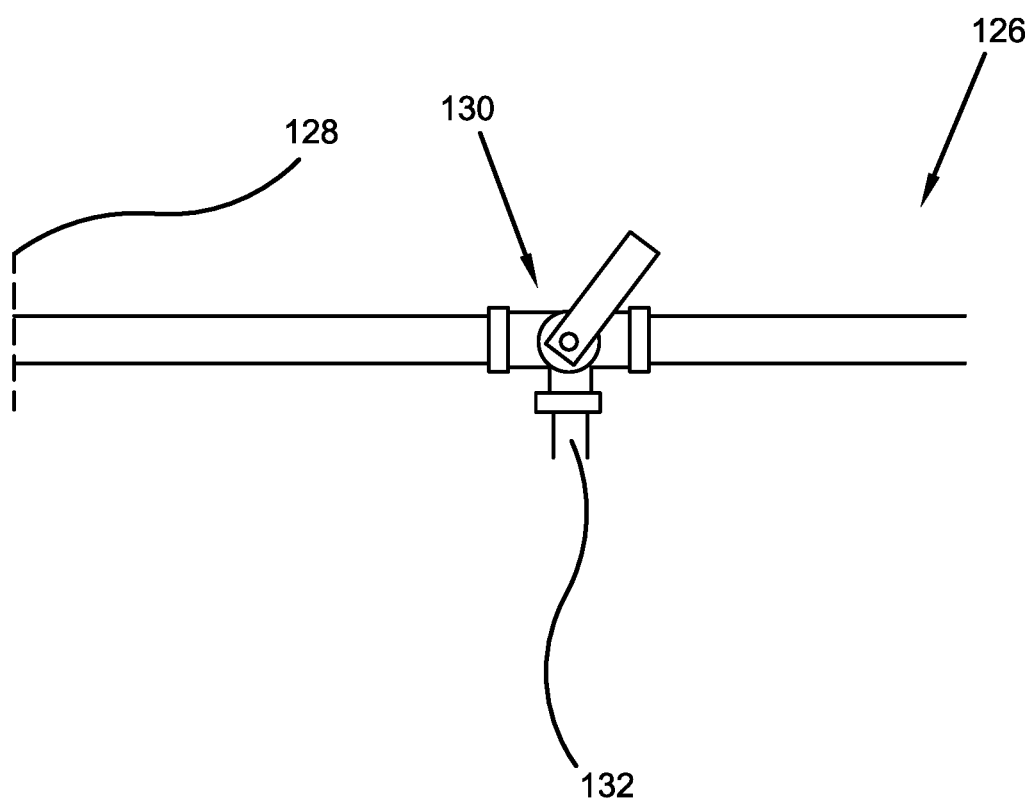
FIG. 5 illustrates a side view of a water recycling outlet of an overflow water collection component of the bathing water recycling system of the present invention in accordance with the disclosed architecture.
Figure 6:
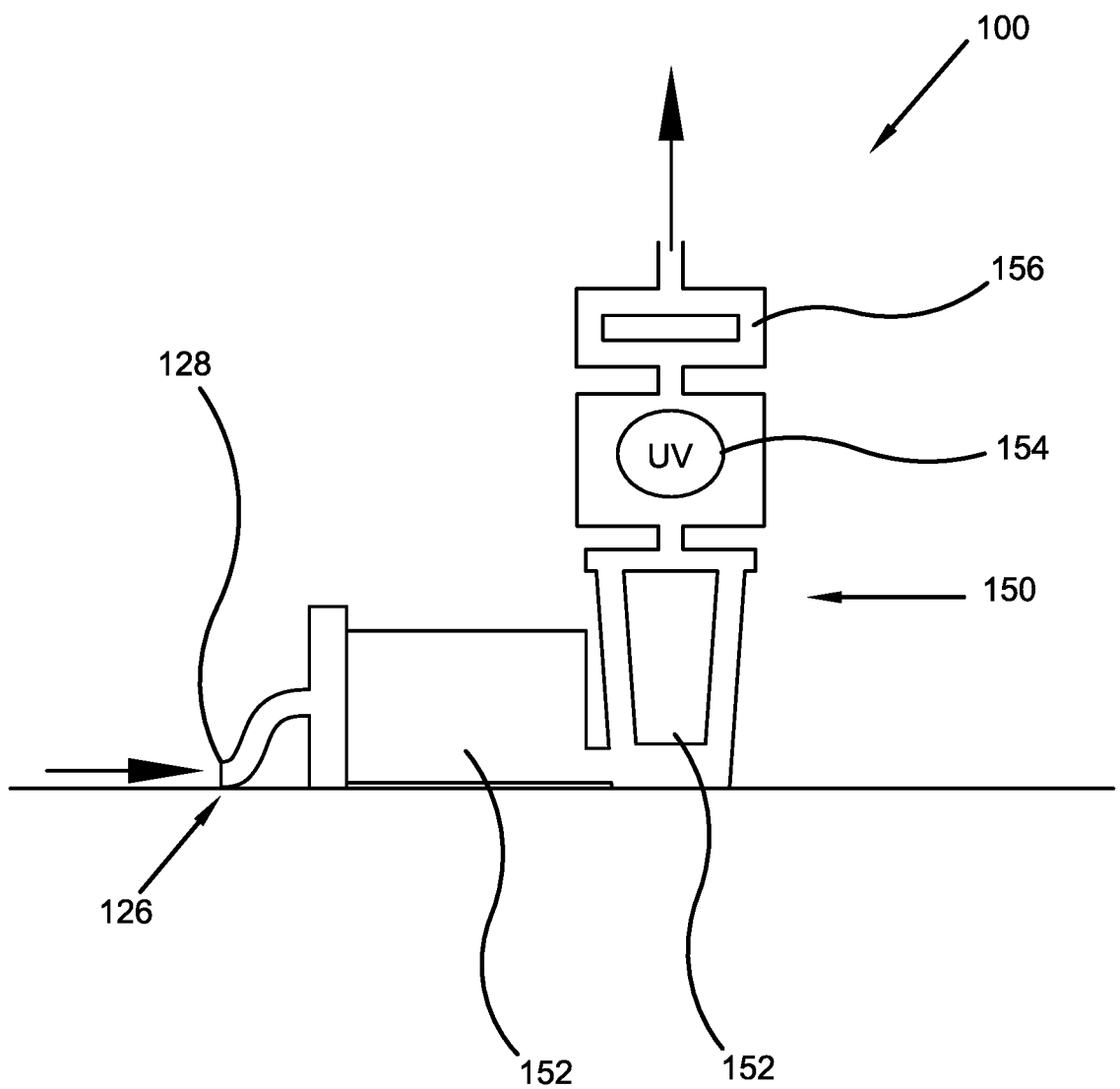
FIG. 6 illustrates a side view of a pump and a water recycling component of the bathing water recycling system of the present invention in accordance with the disclosed architecture.

As illustrated in FIGS. 3, 5, and 6, the overflow water collection component 120 comprises a water recycling outlet 126. The water recycling outlet 126 is an opening and may comprise a plurality of grates 128 configured to grossly filter or protect the opening. The water recycling outlet 126 further comprises a three-way valve 130. The three-way valve 130 comprises a greywater drain 132.

The bathing water recycling system 100 further comprises a water recycling component 150 and a pump 140. The pump 140 is in fluid communication with the water recycling component 150. The pump 140 draws the overflow water from the overflow water collection component 120 through the water recycling outlet 126 and into the water recycling component 150. The water recycling component 150 is configured to treat the overflow water. The overflow water may be mechanically filtered, chemically filtered, purified, or any combination thereof. The overflow water may also be reheated. The pump 140 is configured to redirect the treated water back into the primary water collection component.

As illustrated in FIG. 6, the water recycling component 150 may comprise a filtration element 152. The filtration element 152 is configured to filter the overflow water mechanically or chemically. The filtration element 152 may be a mechanical filtration mesh or ceramic pore structure filter, a chemical activated carbon absorption filter, a sequestration filter, an ion exchange resin filter, a reverse osmosis filter, or any combination thereof.

The water recycling component 150 may comprise a purification element 154. The purification element 154 is configured to purify the overflow water by sterilization. The purification element 154 may be an ultra-violet water sterilizer.

The water recycling component 150 may comprise a heating element 156. The heating element 156 may be a metallic rod or other similar resistance heating element. The heating element 156 is configured to reheat the overflow water prior to reuse. Once the overflow water is treated, the pump 140 redirects the treated water back into the primary water collection bathtub 110 for reuse. The treated water mixes with bathing water in the tub to keep the water temperature constant with the clean bathing water.

The bathing water recycling system 100 may further comprises a controller 160. The controller 160 may be located on any part of the primary water collection component 110. The controller 160 is configures to operate the pump 140 and the three-way valve 130. The controller 160 directs the water overflow to the water recycling component 150 or to the greywater drain 132 of the three-way valve 130 as desired.

Figure 8:
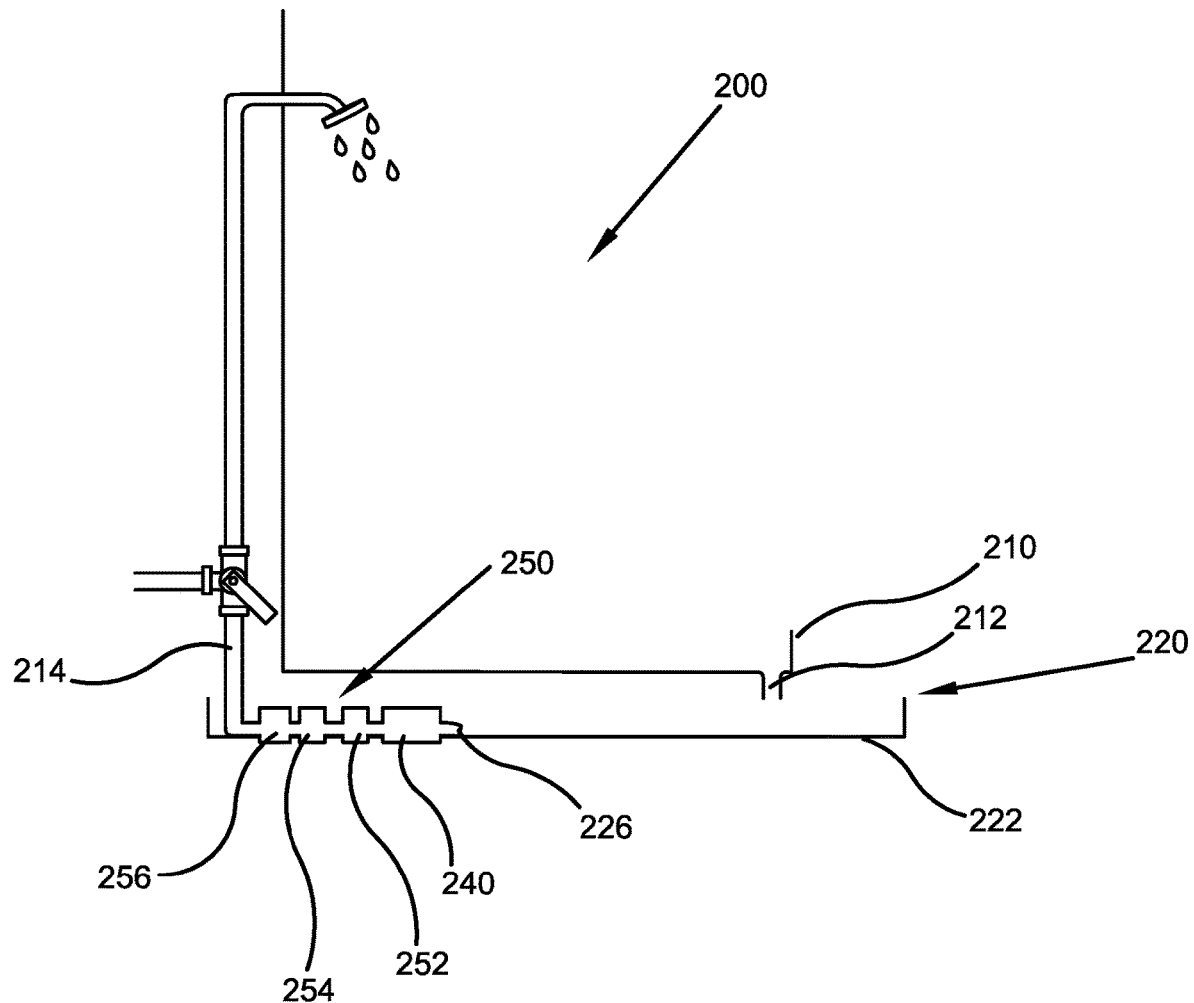
FIG. 8 illustrates a side view of a bathing water recycling system of the present invention for a shower in accordance with the disclosed architecture.

In an additional embodiment as illustrated in FIG. 8, the subject matter disclosed and claimed herein, in one embodiment thereof, comprises a bathing water recycling system 200 for a shower. The bathing water recycling system 200 comprises a primary water collection shower pan 210 and an overflow water collection catch basin 220. The primary water shower pan 210 comprises a plurality of sidewalls and a floor. Used water may overflow the plurality of sidewalls and down into the overflow water collection catch basin 220. The overflow water collection catch basin 220 may be a catch basin 222. Alternatively, the primary water collection shower pan 210 may further comprise a greywater outlet 212. The greywater outlet 212 penetrates one or more of the plurality of sidewalls or the floor and leads to the overflow water collection catch basin 220. A treated water inlet 214 may lead back into the shower via the showerhead.

The overflow water collection catch basin 220 is configured for receiving and retaining water overflow from the primary water collection shower pan 210. The overflow water collection catch basin 220 is positioned directly below or underneath the primary water collection shower pan 210. The overflow water collection component 220 may be constructed from plastic or natural materials. The overflow water collection component 220 is positioned directly below or underneath the primary water collection component 210. The overflow water collection component 220 is wider and longer than the primary water collection component 210 so as to be able to collect and hold any overflow water. The overflow water collection component 220 is typically at least three inches in depth to be able to hold all of the overflow water.

The overflow water collection catch basin 220 comprises a water recycling outlet 226. The water recycling outlet 226 may comprise a plurality of grates (similar to 128) configured to grossly filter and protect the opening. The water recycling outlet 226 further comprises a three-way valve (similar to 130). The three-way valve comprises a greywater drain (similar to 132).

The bathing water recycling system 200 further comprises a water recycling component 250 and a pump 240. The pump 240 is in fluid communication with the water recycling component 250. The pump 240 draws the overflow water from the overflow water collection component 220 through the water recycling outlet 226 and into the water recycling component 250. The water recycling component 250 is configured to treat the overflow water. The overflow water may be mechanically filtered, chemically filtered, purified, or any combination thereof. The overflow water may also be reheated. The pump 240 is configured to redirect the treated water back into the shower.

The water recycling component may comprise a filtration element 252. The filtration element 252 is configured to filter the overflow water mechanically or chemically. The filtration element 252 may be a mechanical filtration mesh or ceramic pore structure filter, a chemical activated carbon absorption filter, a sequestration filter, an ion exchange resin filter, a reverse osmosis filter, or any combination thereof.

The water recycling component 250 may comprise a purification element 254. The purification element 254 is configured to purify the overflow water by sterilization. The purification element 254 may be an ultra-violet water sterilizer.

The water recycling component 250 may comprise a heating element 256. The heating element 256 may be a metallic rod or other similar resistance heating element. The heating element 256 is configured to reheat the overflow water prior to reuse. Once the overflow water is treated, the pump 240 redirects the treated water back into the shower for reuse via the treated water inlet 214.

Notwithstanding the forgoing, the bathing water recycling system 100 and 200 can be any suitable size, shape, and configuration as is known in the art without affecting the overall concept of the invention, provided that it accomplishes the above stated objectives. One of ordinary skill in the art will appreciate that the shape and size of the bathing water recycling system 100 and 200 and its various components, as show in the FIGS. are for illustrative purposes only, and that many other shapes and sizes of the bathing water recycling system 100 and 200 are well within the scope of the present disclosure. Although dimensions of the bathing water recycling system 100 and 200 and its components (i.e., length, width, and height) are important design parameters for good performance, the bathing water recycling system 100 and 200 and its various components may be any shape or size that ensures optimal performance during use and/or that suits user need and/or preference. As such, the bathing water recycling system 100 and 200 may be comprised of sizing/shaping that is appropriate and specific in regard to whatever the bathing water recycling system 100 and 200 is designed to be applied.

What has been described above includes examples of the claimed subject matter. It is, of course, not possible to describe every conceivable combination of components or methodologies for purposes of describing the claimed subject matter, but one of ordinary skill in the art may recognize that many further combinations and permutations of the claimed subject matter are possible. Accordingly, the claimed subject matter is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:
1. A bathing water recycling system comprising:
   a primary water collection component (110, 210) including:
      a bathtub (110) having a grey water outlet (112) extending through a sidewall of the bathtub (110); or
      a shower (200) having a shower pan (210) including a greywater outlet (212) the extends through one or more sidewalls of the shower pan (210);
   an overflow water collection component (120, 220) comprising a catch basin (122, 220) positioned under and surrounding the bathtub (110) or the shower pan (210), for receiving and retaining water overflow from the bathtub (110) or shower pan (210) or water draining through the respective grey water outlet (112, 212);
   a water recycling component (150, 250) for treating the water overflow to make it capable of recirculation to the bathtub (110) or shower (200); and
   a pump (140, 240) having an inlet in fluid communication with a water recycling outlet (126) of the water recycling component (150, 250) for redirecting the treated water back into the primary water collection component (110, 210) through a treated water inlet (114, 214).

2. The bathing water recycling system of claim 1, wherein the water recycling component (150) comprises a filtration element (152) selected from the group consisting of: a mechanical filtration mesh, a ceramic filter, an activated carbon absorption filter, a sequestration filter, an ion exchange resin filter, a reverse osmosis filter, or any combination thereof.

3. The bathing water recycling system of claim 1, wherein the water recycling component (150) comprises a purification element (154) capable of purifying the overflow water by sterilization.

4. The bathing water recycling system of claim 3, wherein the purification element (154) comprises an ultra-violet water sterilizer.

5. The bathing water recycling system of claim 1, wherein the water recycling component (150) comprises a heating element (156).

6. The bathing water recycling system of claim 5, wherein the heating element (156) comprises a resistance heating element.

7. The bathing water recycling system of claim 1, wherein the water recycling outlet (126) comprises a three-way valve (130).

8. The bathing water recycling system of claim 1, wherein the overflow water collection component (120, 220) is at least three inches in depth.

\* \* \* \* \*